(12) United States Patent
Graham et al.

(10) Patent No.: US 8,251,691 B2
(45) Date of Patent: Aug. 28, 2012

(54) RETICULATION SYSTEM FOR COMPOSITE COMPONENT PRODUCTION

(75) Inventors: Neil Deryck Bray Graham, North Coogee (AU); Arthur Deryck Bray Graham, North Fremantle (AU); Haydn Law, Wembley (AU)

(73) Assignee: Quickstep Technologies Pty Ltd, North Coogee, WA (AU)

( * ) Notice: Subject to any disclaimer, the term of this patent is extended or adjusted under 35 U.S.C. 154(b) by 645 days.

(21) Appl. No.: 12/064,133

(22) PCT Filed: Aug. 25, 2006

(86) PCT No.: PCT/AU2006/001236
§ 371 (c)(1),
(2), (4) Date: Apr. 17, 2008

(87) PCT Pub. No.: WO2007/022593
PCT Pub. Date: Mar. 1, 2007

(65) Prior Publication Data
US 2008/0241302 A1  Oct. 2, 2008

(30) Foreign Application Priority Data
Aug. 26, 2005 (AU) ................... 2005904667

(51) Int. Cl.
*B29C 43/10* (2006.01)
*B29C 70/40* (2006.01)
*B29C 70/44* (2006.01)

(52) U.S. Cl. ............... 425/389; 425/150; 425/326.1; 425/342.1; 425/387.1; 425/394

(58) Field of Classification Search ............ 425/44, 425/50, 51, 52, 110, 111, 112, 116, 128, 425/138, 150, 171, 326.1, 342.1, 387.1, 389, 425/400, 404, 405.1, 503, 522, 523, 538, 425/DIG. 19, 117, 388, 390, 504
See application file for complete search history.

(56) References Cited

U.S. PATENT DOCUMENTS

| | | | | |
|---|---|---|---|---|
| 3,642,415 | A * | 2/1972 | Johnson | 425/389 |
| 3,830,611 | A * | 8/1974 | Irwin | 425/144 |
| 3,982,867 | A * | 9/1976 | Pruett | 425/171 |
| 3,988,092 | A * | 10/1976 | Bloxham et al. | 425/150 |

(Continued)

FOREIGN PATENT DOCUMENTS
EP  0 603 896  6/1994
(Continued)

OTHER PUBLICATIONS

Search Report dated Aug. 17, 2011 in corresponding European Application No. 06774865.7.

*Primary Examiner* — Joseph Del Sole
*Assistant Examiner* — Seyed Masoud Malekzadeh
(74) *Attorney, Agent, or Firm* — Faegre Baker Daniels LLP (57) ABSTRACT

A fluid reticulation system for a composite component production assembly, the production assembly including at least one pressure chamber (25) having a chamber wall (21) locatable adjacent a composite lay-up or mold, at least a portion of the chamber wall (21) being resiliently deformable, the fluid reticulation system being locatable within the inner volume of the pressure chamber (25) and including means (5) for distributing fluid towards an inner surface (22) of the chamber wall as the fluid enters the pressure chamber.

17 Claims, 9 Drawing Sheets

U.S. PATENT DOCUMENTS

| | | | | |
|---|---|---|---|---|
| 4,012,186 A * | 3/1977 | Ramazzotti et al. | ........... | 425/123 |
| 4,035,118 A * | 7/1977 | MacMillan | ..................... | 425/25 |
| 4,083,918 A * | 4/1978 | Ronden et al. | ............. | 264/297.5 |
| 4,162,877 A * | 7/1979 | Nyberg | ........................... | 425/84 |
| 4,240,778 A * | 12/1980 | Korytko | ........................ | 425/149 |
| 4,397,625 A * | 8/1983 | Hellmer et al. | ............... | 425/135 |
| 4,608,009 A * | 8/1986 | Whiteside et al. | ............ | 425/590 |
| 4,663,225 A * | 5/1987 | Farley et al. | ..................... | 442/71 |
| 4,689,004 A * | 8/1987 | Kunkel | ........................ | 425/407 |
| 4,786,351 A * | 11/1988 | Elliott et al. | .................. | 156/245 |
| 4,956,133 A * | 9/1990 | Payne | ............................ | 264/39 |
| 5,026,266 A * | 6/1991 | Takasaki et al. | .............. | 425/150 |
| 5,123,823 A * | 6/1992 | Banjo et al. | ................... | 425/116 |
| 5,154,787 A * | 10/1992 | Gardner et al. | ............... | 156/166 |
| 5,225,121 A | 7/1993 | Yokoshima | | |
| 5,252,053 A * | 10/1993 | Schraven et al. | ............. | 425/127 |
| 5,288,221 A * | 2/1994 | Stoerr et al. | ................... | 425/125 |
| 5,297,897 A * | 3/1994 | Venrooij et al. | ............... | 425/116 |
| 5,518,385 A * | 5/1996 | Graff | ............................ | 425/127 |
| 5,522,713 A * | 6/1996 | Lian | ............................... | 425/116 |
| 5,529,479 A * | 6/1996 | Souders | ........................ | 425/384 |
| 5,759,591 A * | 6/1998 | Rhoades et al. | ............ | 425/387.1 |
| 5,785,910 A * | 7/1998 | Sakashita et al. | ............ | 264/45.5 |
| 5,800,844 A * | 9/1998 | Raio et al. | ...................... | 425/150 |
| 5,800,846 A * | 9/1998 | Hart | ............................... | 425/504 |
| 5,820,887 A * | 10/1998 | Mogel | ............................ | 425/64 |
| 5,971,730 A * | 10/1999 | Thary | ........................... | 425/4 R |
| 6,149,844 A | 11/2000 | Graham | | |
| 6,257,858 B1 | 7/2001 | Pabsch et al. | | |
| 6,267,577 B1 * | 7/2001 | Nishi et al. | .................... | 425/116 |
| 6,338,618 B1 * | 1/2002 | Van Ert et al. | .................... | 425/3 |
| 6,443,054 B1 * | 9/2002 | McCarney | ...................... | 99/349 |
| 7,090,485 B2 * | 8/2006 | Bibeau | .......................... | 425/388 |
| 7,210,919 B2 * | 5/2007 | Senosiain | ..................... | 425/169 |
| 7,635,262 B2 * | 12/2009 | Chou et al. | .................... | 425/385 |
| 7,686,606 B2 * | 3/2010 | Harper et al. | .................. | 425/385 |
| 7,717,696 B2 * | 5/2010 | Chou et al. | .................... | 425/400 |
| 7,726,962 B2 * | 6/2010 | Aramburu et al. | ............ | 425/117 |
| 2003/0173019 A1 * | 9/2003 | Eberth et al. | .................. | 156/176 |
| 2004/0113315 A1 | 6/2004 | Graham | | |
| 2005/0069600 A1 * | 3/2005 | Scolamiero et al. | .......... | 425/149 |

FOREIGN PATENT DOCUMENTS

| | | |
|---|---|---|
| EP | 1 008 436 | 6/2000 |
| WO | 02/058916 | 8/2002 |

* cited by examiner

RETICULATION SYSTEM FOR COMPOSITE COMPONENT PRODUCTION

CROSS-REFERENCE TO RELATED APPLICATION

This application is related to and claims the benefit under 35 U.S.C. §119 and 35 U.S.C. §365 of International Application No. PCT/AU2006/001236, filed Aug. 25, 2006.

The present invention is generally directed to the production of components formed from composite material, and is in particular directed to a fluid reticulation system for use in such an application.

The applicant has developed various production systems and methods for producing components made of composite material. Such material may include fiberglass or carbon fiber impregnated and cured or thermoformed within a resin matrix. Alternative types of composite material can however be used. Such composite production systems and methods are for example described in the Applicant's U.S. Pat. No. 6,149,844 and International Patent Application No. PCT/AUO2/00078. A common feature of each of the Applicant's systems is the use of pressure chambers through which fluid at different temperatures and at elevated pressure can be circulated. Each pressure chamber can be provided with a resiliently deformable chamber wall locatable under or over a mold assembly supporting a composite lay-up. Alternatively, the chamber wall may be in the form of a floating rigid mold supporting the composite lay-up, the mold being connected along its periphery by a resiliently deformable flange to the rest of the pressure chamber.

Fluids at different temperatures can be circulated through each pressure chamber during the different stages of the production process. The fluid is circulated by means of a fluid distribution system of the type as for example described in U.S. Pat. No. 6,149,844. This system incorporates a number of separate fluid tanks, each tank holding fluid at a different temperature. The tanks are interconnected by a system of pipes and valves to allow fluid at either a high, medium or low temperature to be circulated through the pressure chamber. The pressure chamber is typically provided with an intake port through which the fluid can enter and a discharge port through which the fluid is discharged from the pressure chamber. The circulation of fluid at high temperature acts to provide both the heat for curing the composite lay-up as well as the pressure for compacting said lay-up. Following the end of the curing stage, fluid at a medium temperature can be used to displace the fluid at high temperature from the pressure chamber, this high temperature fluid being subsequently returned to the high temperature tank. Low temperature fluid can then be delivered to the fluid chamber to displace the medium temperature fluid to thereby provide the final cooling for the cured component.

The fluid is transferred through the pressure chamber by the simple flood irrigation of the chamber, with the fluid moving in a wave of fluid of different temperature moving from one side to the other side of the chamber displacing the earlier fluid from that chamber. A series of baffles may be provided within the pressure chamber to help to distribute the fluid throughout the chamber. While this flood irrigation approach works well for fluid such as water which has only small variations in viscosity with temperature, this approach is less effective where oil based fluids having significant changes in viscosity are used. This can lead to the situation where the wave of high temperature fluid entering the pressure chamber will take the path of least resistance as it moves from one side to the other side of the chamber thereby leaving "islands" of cool temperature fluid of higher viscosity, with rivers of high temperature lower viscosity fluid moving around them.

This can lead to a variation in the heat applied to different parts of a curing composite lay-up resulting in uneven and slower curing of the component.

It is therefore an object of the present invention to provide for more uniform curing of a composite lay-up.

With this in mind, the present invention provides in one aspect, a fluid reticulation system for a composite component production assembly, the production assembly including at least one pressure chamber having a chamber wall locatable adjacent a composite lay-up or mold, at least a portion of the chamber wall being resiliently deformable, the fluid reticulation system being locatable within the inner volume of the pressure chamber and including means for distributing fluid towards an inner surface of the chamber wall as the fluid enters the pressure chamber.

According to another aspect of the present invention, there is provided a pressure chamber for a composite component production assembly having a fluid reticulation system as described above.

The distribution means may include discharge means for directing a series of fluid jets in a direction towards the chamber wall inner surface. The fluid direction of the fluid jets may be at an acute angle to the chamber wall inner surface immediately adjacent said fluid jets. The angling of the fluid jets minimizes the potential for turbulent mixing of fluid directly adjacent the chamber wall inner surface this assists to improve the heat transfer efficiency as well as leading to decreases in temperature variations in the heat transferred at different areas of the inner surface.

As the fluid is directed at an angle towards the chamber wall inner surface it tends to initially flow along that inner surface. The Applicant considers that this is in part due to the "Coanda Effect" which refers to the phenomenon of a fluid stream tending to flow along a closely adjacent surface. As a series of fluid jets may be provided adjacent at least a major portion of the chamber wall, this leads to a layer of fluid flowing immediately adjacent the chamber wall inner surface and having a uniform temperature. The result is more uniform heating or cooling of the mold assembly and composite lay-up located adjacent or forming part of the chamber wall.

According to a preferred embodiment, the fluid reticulation system may include a plurality of parallel reticulation lines, each line having a series of discharge ports or nozzles extending along at least a substantial part of the length of each line.

The reticulation lines may for example be configured as a hollow pipe having a series of said discharge ports along its length. A series of these pipes may be held in parallel configuration with supply manifolds being provided at opposing ends of the pipes for holding the pipes in position as well as for supplying fluid to the pipes. The pipes are positioned so that the fluid jet delivered by the discharge port is directed at an angle to the inner surface of the chamber wall. The fluid jets may also be directed into corners and other areas within the pressure chamber where it is difficult to otherwise distribute the fluid due to the internal shape of the chamber. This is advantageous if components of complex deep shapes are being produced.

The fluid reticulation system may be located within a rigid trough forming the sides and base of the pressure chamber. As the fluid will tend to flow in a general direction along the chamber wall inner surface, the trough may direct fluid displaced by the incoming fluid as well as the incoming fluid stream itself to an outlet port of the chamber. This results in the general direction of flow of the distributed fluid from the inlet side to the outlet side of the pressure chamber.

Also these nozzles can have specifically shaped jets to suit their position in the chamber to provide the maximum breaking up effect on the "islands" of cooler and therefore higher viscosity fluid within the chamber.

There may be circumstances where fluid jets directed in one direction only are not sufficient to break up the islands of cooler fluid near the chamber wail. In these situations the discharge means may include a rotating sprinkler head located on at least some of the discharge ports. These sprinkler heads produce at least one fluid jet that is discharged in a continually varying direction that rotates around a central rotational axis. These moving jets thereby facilitate the breaking up of the islands of higher viscosity fluid.

A disadvantage associated with the use of flood irrigation and jet reticulation to transfer fluid at different temperatures as the temperature cycles change through the pressure chamber is that there will inevitably be some mixing of the different temperature fluids leading to a loss of energy and thus speed of production. It would be advantageous to be able to fully evacuate the pressure chamber of fluid at one temperature before refilling the chamber with fluid at another temperature. This eliminates mixing of the two fluids. The evacuation could be achieved by using air or nitrogen or other gases to purge the chamber of fluid while at the same time maintaining the pressure within the pressure chamber. It is also possible to simply pump the fluid from the pressure chamber, but this would then lead to a loss of the pressure therein which acts to both apply the compaction force on the composite lay-up as well as to support the mold in position. It would therefore be advantageous to provide a support for the mold such that the fluid can be evacuated from the pressure chamber while the mold is held in the correct position.

It would also be advantageous to know where the mold is within the pressure chamber at all times.

With this in mind, according to yet another aspect of the present invention, there is provided a composite component production system including at least one pressure chamber having a chamber wall, at least a portion of the chamber wall being resiliently deformable, a mold supportable on the chamber wall or forming part of said chamber wall and a support arrangement for supporting the mold at a predetermined height relative to a base of the pressure chamber.

The support arrangement may include at least one support member including a shaft with an abutment for engaging said chamber wall. The shaft may be resiliently supported by a resilient means such as a spring or may form the shaft of a hydraulic or pneumatic ram.

The composite production system may include a second pressure chamber located above the mold, the second pressure chamber housing a second chamber wall, at least a portion of the second chamber wall being resiliently deformable. At least one measuring arrangement may also be located above the mold, the measuring arrangement including a shaft having an abutment for engaging the second chamber wall. A resilient means such as a spring may urge the abutment against the second chamber wall.

A measuring device may determine the relative displacement of a said shaft of the support arrangement to thereby ascertain the height of the mold above said base of the pressure chamber. A measuring device may also determine the displacement of a said shaft of the measuring arrangement. The measuring device may be in the form of a magnetic measuring device or proximity device, and the shaft may be made of non-magnetic material but may have a magnetic end portion located adjacent said device.

The movement of said magnet or magnetic material moving past or remaining in front of the magnetic sending device provides a signal that can be used to control the operation of the valves allowing fluid into or out of the top and bottom pressure chamber. The movement of fluid into the pressure chamber under pressure without a balancing increase in pressure in the other opposing pressure chamber results in a differential in pressure between the chambers and a subsequent movement of the mold from the high pressure chamber into the low pressure chamber. In this way the mold can "float" between the chambers as its weight is supported by the differential in pressure between the chambers. This pressure need not be significant to support even very heavy Invar (trade mark) metal tooling.

The floating of the mold between the two chambers such that the gap between the chamber walls and the bladder or mold is controlled and generally even both top and bottom will generally result in an optimized fluid flow on both sides of the mold in this way maximizing the heat transfer between the high temperature fluid and the part thus increasing the cure rate and decreasing the time to produce a part.

This controlled floating effect can be achieved and maintained by knowing where the mold is and holding the mold in this optimized position. This can for example be done by watching a display and seeing the movement of the mold and then manually by opening and closing the valves to allow more or less pressurized high temperature fluid into the bottom or top pressure chamber to hold the mold in the optimum position. This can be achieved by increasing the flow into the chamber or by restricting the flow out of the chamber either way results in an increase in relative pressure. Alternatively or in concert with manual adjustment a programmable logic controller (PLC) or personal computer (PC) can be used to provide a closed loop feed back system that has been shown to provide very accurate control of the floating effect and minimal movement away from optimum. A general control position within a range of + or −2 mm is generally achieved on the use of the PC and appropriate software to follow the mold movements through the movements of the shaft in contact with the mold and the activation of the magnetic or proximity measuring devices. In this way very little movement is registered by the mold and optimum curing conditions are maintained.

According to a further aspect of the present invention, there is provided a composite component production system as described above further including a fluid reticulation system as described above.

This support arrangement allows the pressure chamber to be evacuated of fluid while still maintaining the mold at a height above the pressure chamber base to prevent collapse of the pressure chamber and/or damage to the chamber wall. Preferably a gas pressure is maintained within the pressure chamber to help to support the mold. It also allows for a controlled fluid communication between opposing pressure chambers to ensure that the pressures are generally balanced between the chambers.

The temporary evacuation of the pressure chamber will however lead to a temporary stop to the heat transfer to or from the mold and composite lay-up. The fluid reticulation system according to the present invention is particularly advantageous for use in the pressure chamber because it allows for the fluid to uniformly refill the pressure chamber under the mold while also allowing the fluid to impinge against and re-establish the heat transfer to or from the mold. The support arrangement will help to ensure that the chamber wall is located at an appropriate distance from the fluid reticulation system to ensure that the discharge ports are not blocked by the chamber wall, and to ensure that the fluid jets impinge the inner surface of the chamber wall at a correct angle.

It will be convenient to further describe the invention with respect to the accompanying drawings which illustrate preferred embodiments of the fluid reticulation system according to the present invention. Other embodiments of the invention are possible, and consequently, the particularity of the accompanying drawings is not to be understood as superseding the generality of the preceding description of the invention.

Figure 1:
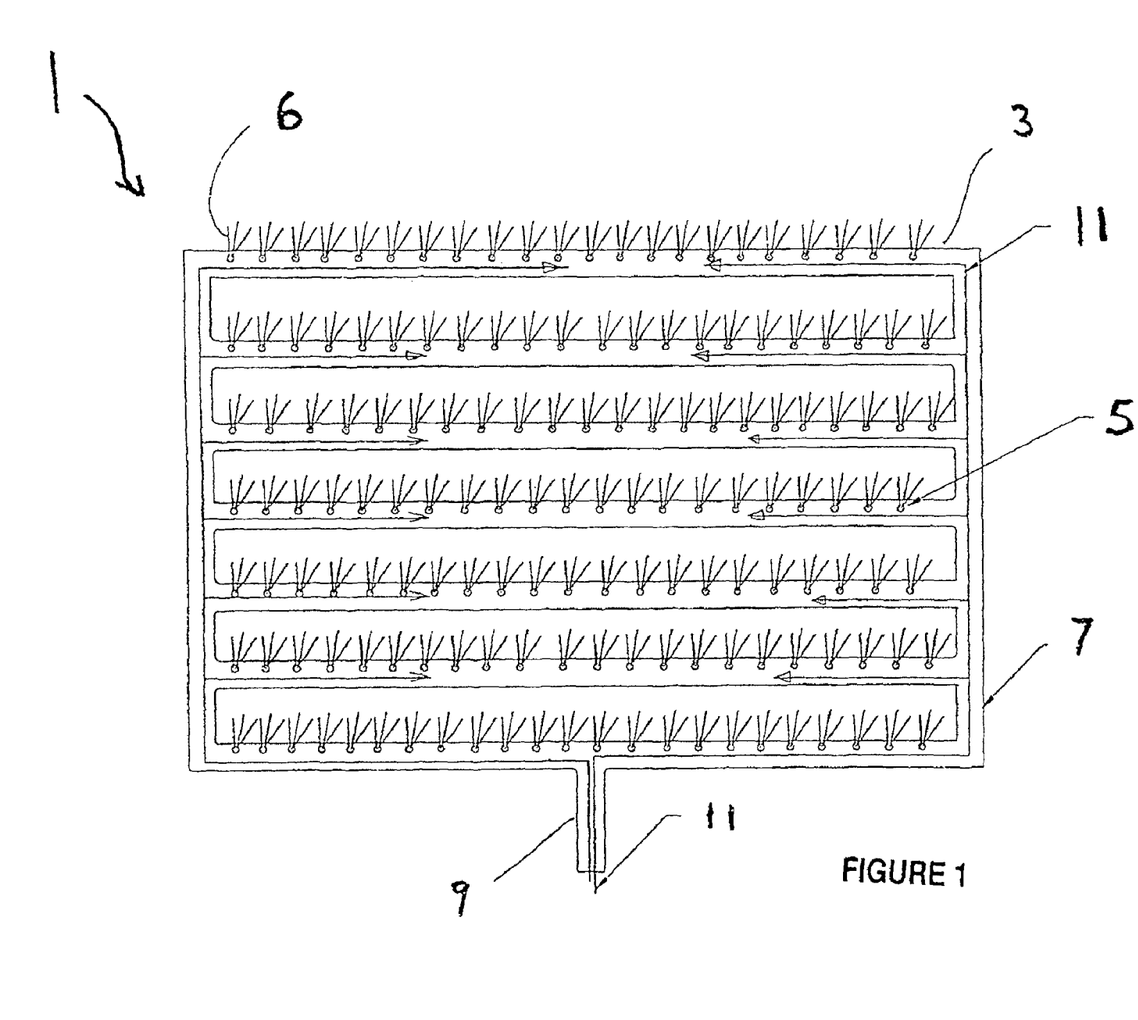
FIG. 1 is a plan view of a fluid reticulation system according to the present invention.

Referring initially to FIG. 1, there is shown a fluid reticulation system 1 according to the present invention. The system 1 includes a plurality of reticulation lines 3, with each reticulation line including a series of discharge ports 5 from which jets 6 of heat transfer fluid may be emitted. It is also envisaged that rotating sprinkler heads (not shown) be provided on at least some of the discharge ports 5. The reticulation lines 3 are positioned in an aligned and parallel relationship by means of supply manifolds 7 provided at opposing ends of each reticulation line 3. An inlet line 9 is provided at one end of the fluid distribution system 1 to allow fluid to flow into each distribution line 3 via the supply manifolds 7. The path of flow of the heat transfer fluid is shown by arrow 11.

Figure 2:
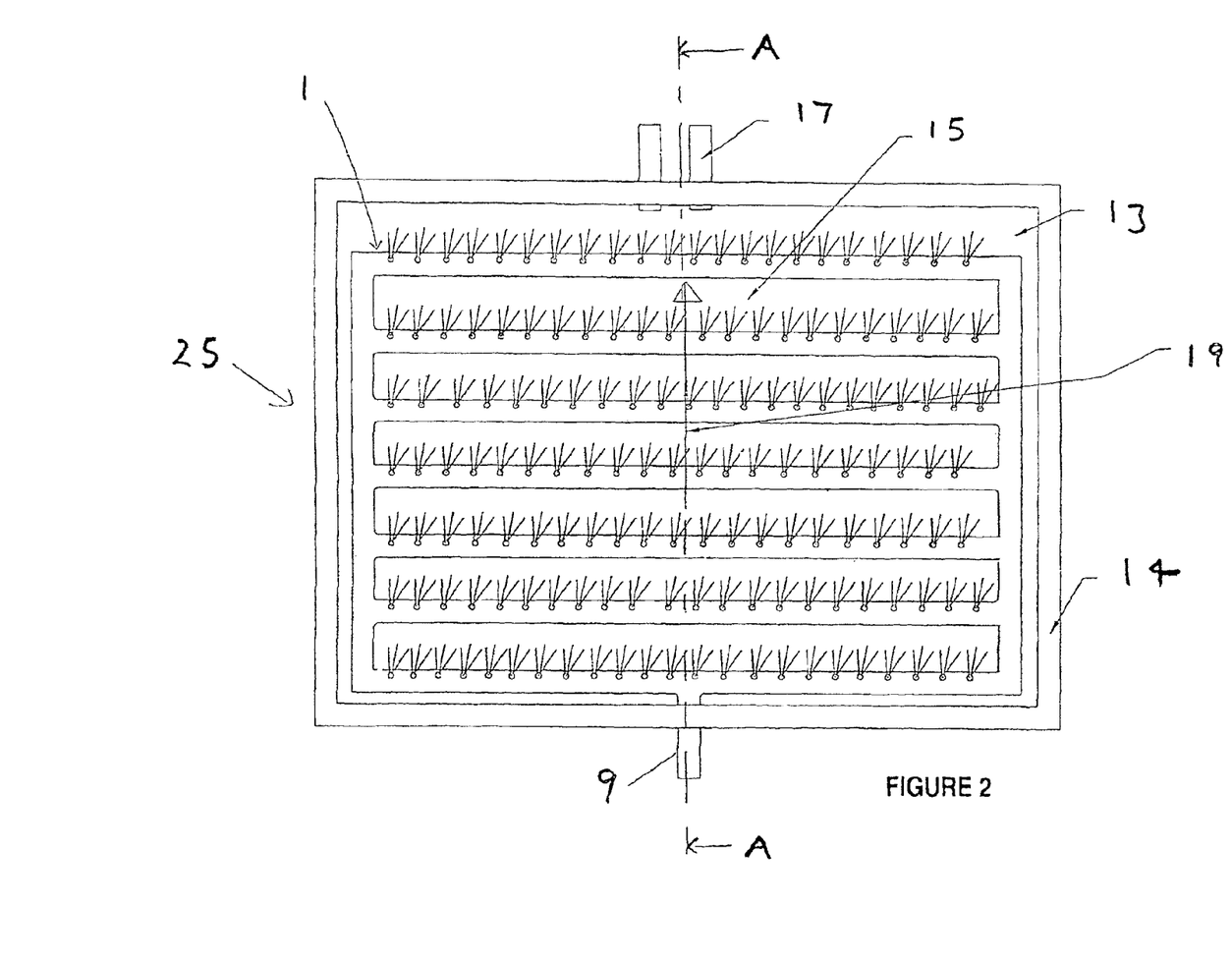
FIG. 2 is a plan view of the fluid reticulation system of FIG. 1 when located within a pressure chamber.

FIG. 2 shows a pressure chamber 25 defined in part by a rigid trough 13, and having the fluid distribution system 1 located within the trough 13. This trough 13 includes a channel 15 inclined in a direction towards discharge lines 17 provided at the end of the channel 15 and within the side wall of the trough 13. A flange 14 is provided along the periphery of the trough 13. The general direction of flow of the heat transfer fluid is shown by arrow 19 which shows fluid flow from the inlet line 9 to the outlet lines 17.

Figure 3:
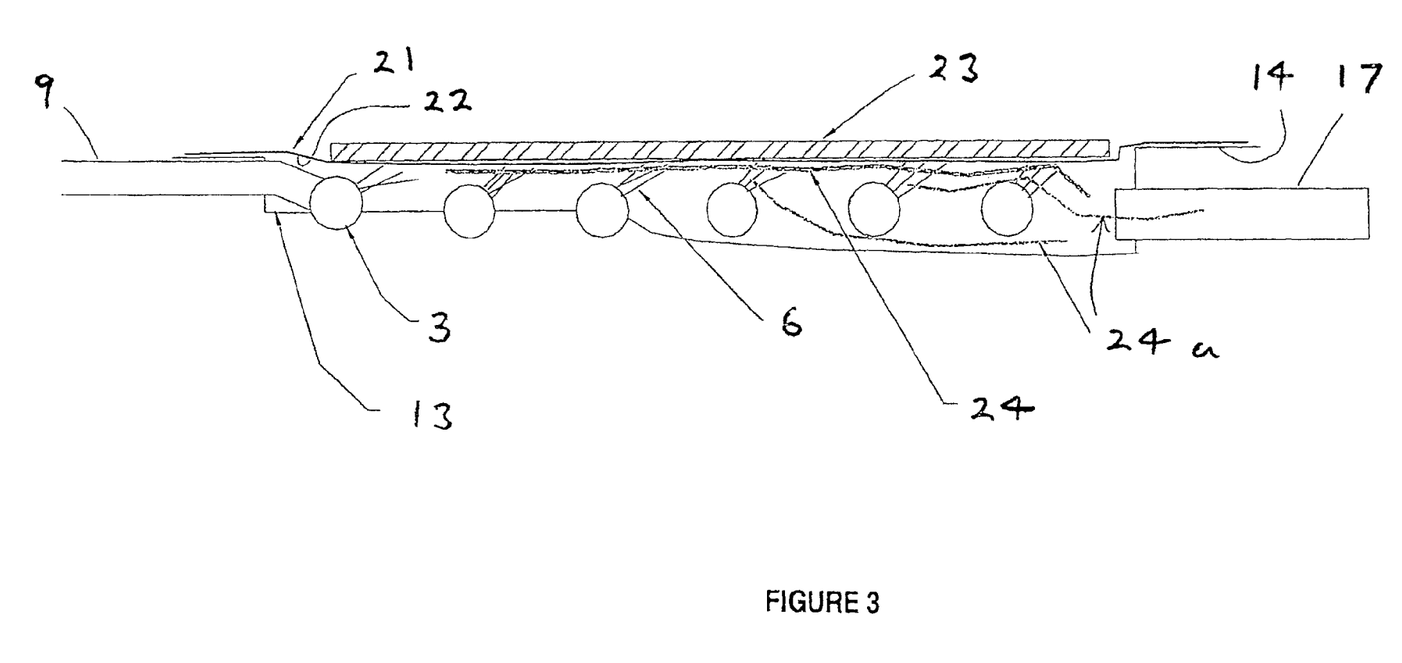
FIG. 3 is a side cross-sectional view taken along line A-A.

FIG. 3 shows in more detail the position of the reticulation lines 3 within the trough 13 and shows a resiliently deformable chamber wall 21 of the pressure chamber 25 supported on the flange 14 of the trough 13 and covering the fluid reticulation system 1 located within The trough. At least some of the reticulation lines 6 may be partially embedded within the bottom of the trough 13 (Ie: the first three lines 6 on the left as shown in FIG. 3). A mold 23 is located on and supported by the resiliently deformable chamber wall 21. The fluid jets 6 being discharged from each discharge port 5 are directed at an angle towards the inner surface 22 of the chamber wall 21. It has been found that a layer of heat transfer fluid 24 can be produced and maintained in a layer adjacent the chamber wall inner surface 22, the heat transfer fluid in this layer 24 being of uniform temperature. This layer 24 will flow in a general direction from the inlet port 9 to the outlet port 17, before being directed by the channel 15 within the trough 13 to the discharge lines 17 along paths 24a.

Figure 4:
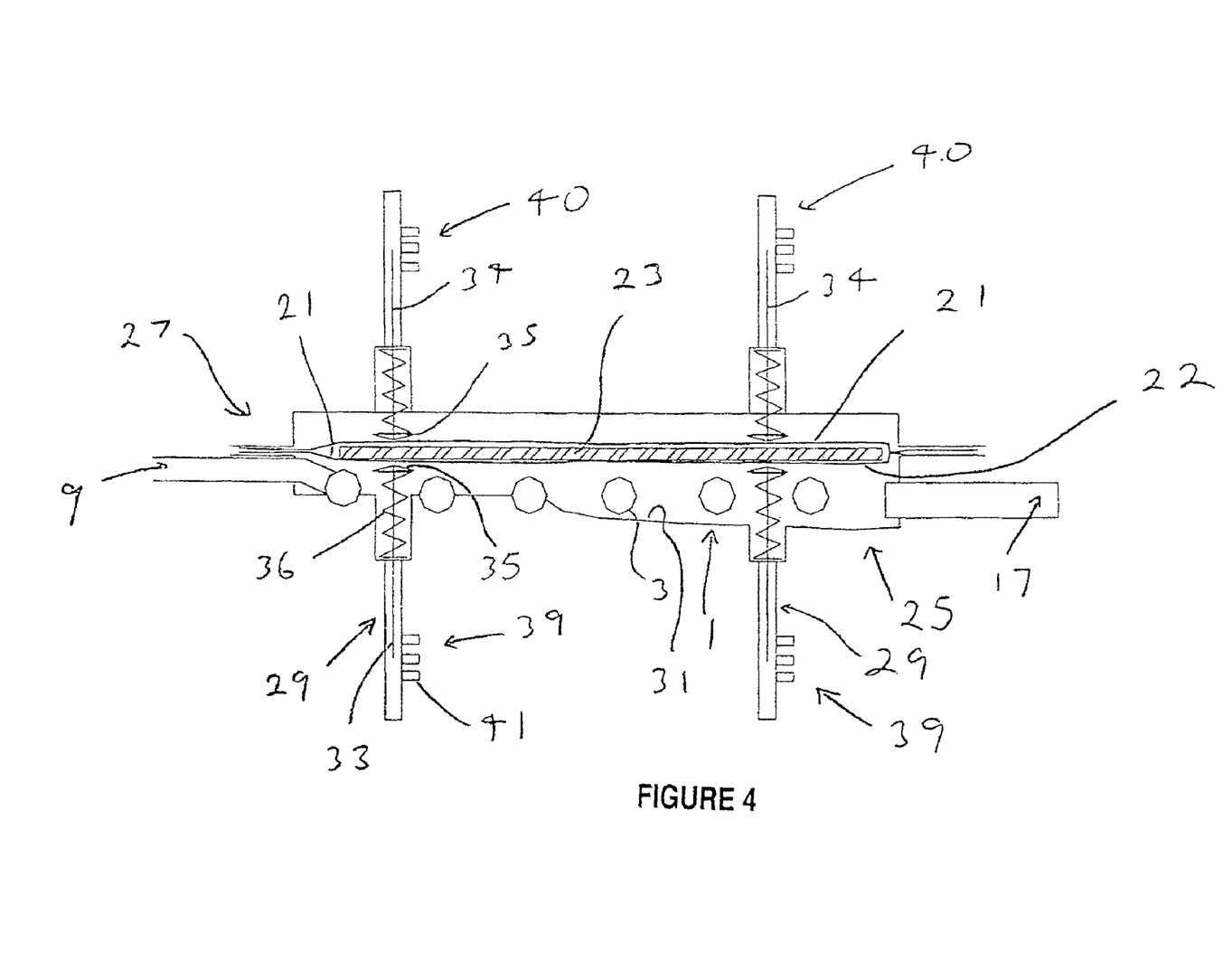
FIGS. 4 and 5 are side cross-sectional views of a composite component production system incorporating a mold support arrangement and fluid reticulation system according to the present invention.
Figure 5:
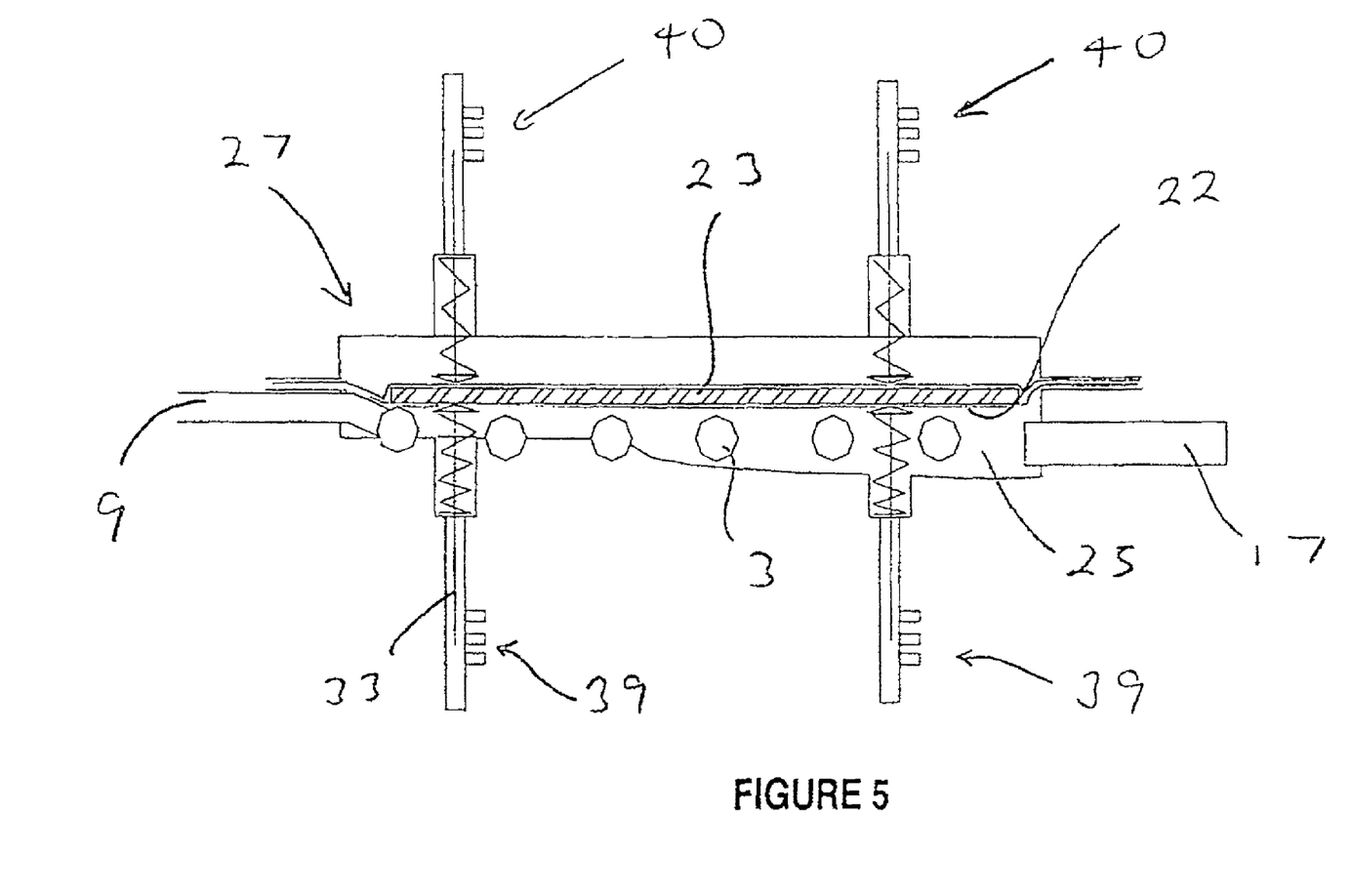

FIGS. 4 and 5 show the embodiment of a composite component production system having a lower pressure chamber 25 as described above and an upper pressure chamber 27. Each pressure chamber includes a resiliently deformable chamber wall 21 between which a mold 23 supporting a composite lay-up can be supported. The operation of the pressure chambers 25, 27 in the production process is already described in detail in the Applicant's International Patent Application No. PCT/AUO2/00078 and will not be described in detail here.

The fluid reticulation system 1 according to the present invention can be located within the bottom pressure chamber 25. In addition, mold support arrangements 29 are provided to maintain the mold 23 at a predetermined location above the base 31 of the bottom pressure chamber 25. Each support arrangement 29 includes a shaft 33 moveable along its elongate axis, and abutment stopper 35 located at the top end of the shaft 33 for engaging the chamber wall inner surface 22. A spring 36 urges the stopper 35 towards the chamber wall 21 to thereby enable a mold 23 to be supported on said chamber wall 22, even when the pressure chamber 25 is not pressurized.

The mold support arrangement 29 may also include a measuring device 39 for determining the position of the shaft 33 relative to the rest of the pressure chamber 25. The measuring device 39 may for example include magnetic measuring devices 41 for monitoring the position of the shaft 33 the devices 41 being adjustable in position to accommodate different molds or part thicknesses. The shaft 33 itself may be formed of non-magnetic material and may include a magnetic end portion 34 adjacent the sensors 39. Measuring devices 39 may also be provided above the mold 23 on the upper pressure chamber 27. The upper pressure chamber 27 is provided with measuring arrangements 40, each including a shaft 34 and stopper 35, this arrangement simply following the movement of the mold 23. This enables an operator to ascertain the actual position of the mold 23 during operation of the production system as will be subsequently described. Means may be provided to allow for adjustment of the position of each shaft 33, 34 to ensure that the mold 23 is properly supported between the pressure chambers 25, 27.

FIG. 5 shows the effect of the mold 23 being incorrectly positioned. If the mold 23 drops too low, it can result in the fluid jets from the reticulation lines 3 becoming impeded or blocked by the inner surface 22 of the chamber wall 21. This can result in a slowing of the curing or cooking process or even the stopping of this process on one side. It is therefore important to ensure that the mold 23 is correctly located. Another means for repositioning the mold may be to provide a control valve (not shown) which acts to direct more heat transfer fluid to the bottom pressure chamber 25 or restrict the flow of heat transfer fluid to the upper pressure chamber 27 thereby increasing the pressure within the bottom chamber to raise the mold 23 to a higher level.

Figure 5A:
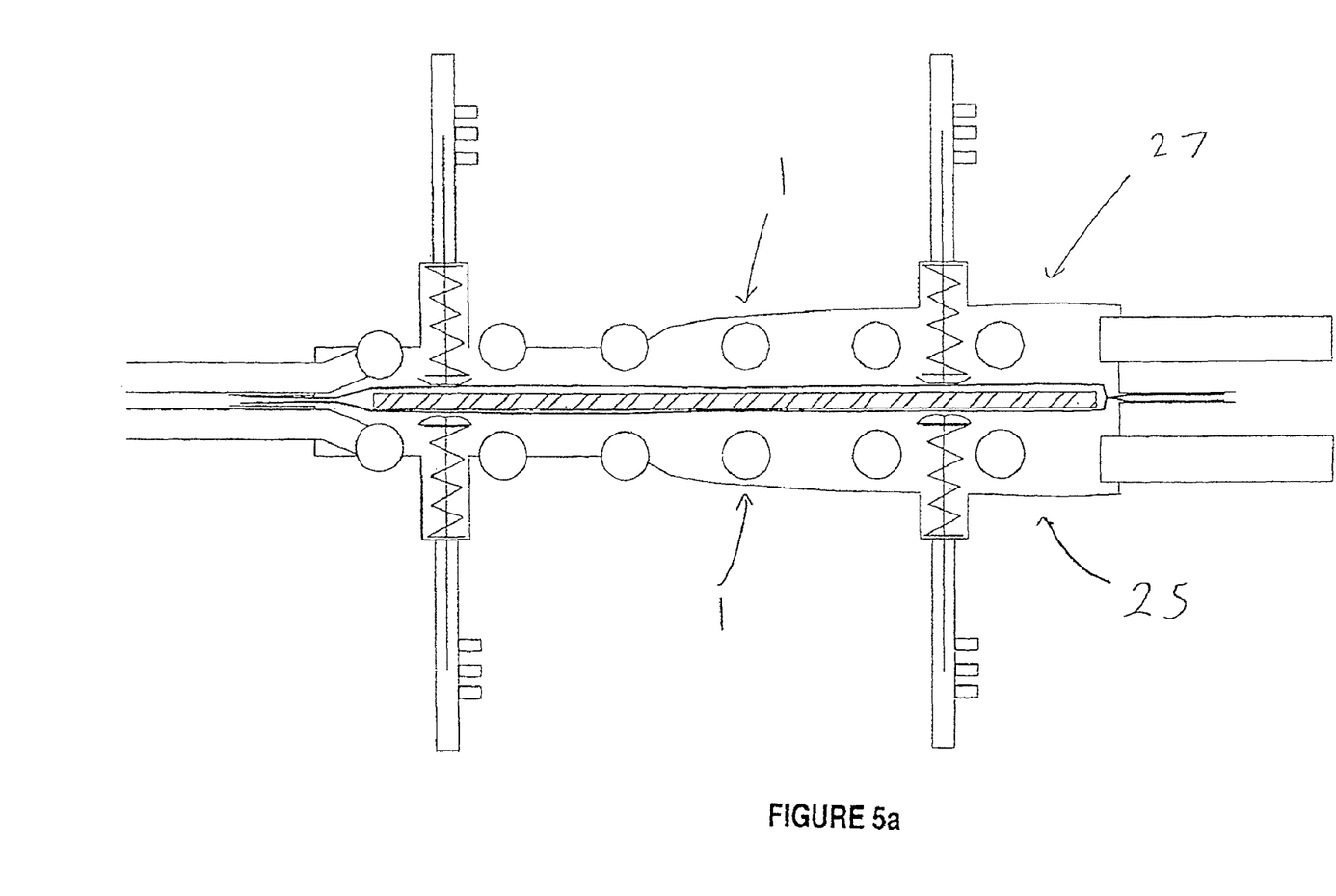
FIG. 5a is a cross-sectional view of another embodiment of a composite component production system incorporating a mold support arrangement and fluid reticulation system according to the present invention.

FIG. 5a shows a variation of the composite component production system as shown in FIGS. 4 and 5. The primary difference is that the fluid reticulation system 1 is located in both the lower pressure chamber 25 and the upper pressure chamber 27.

Figure 6:
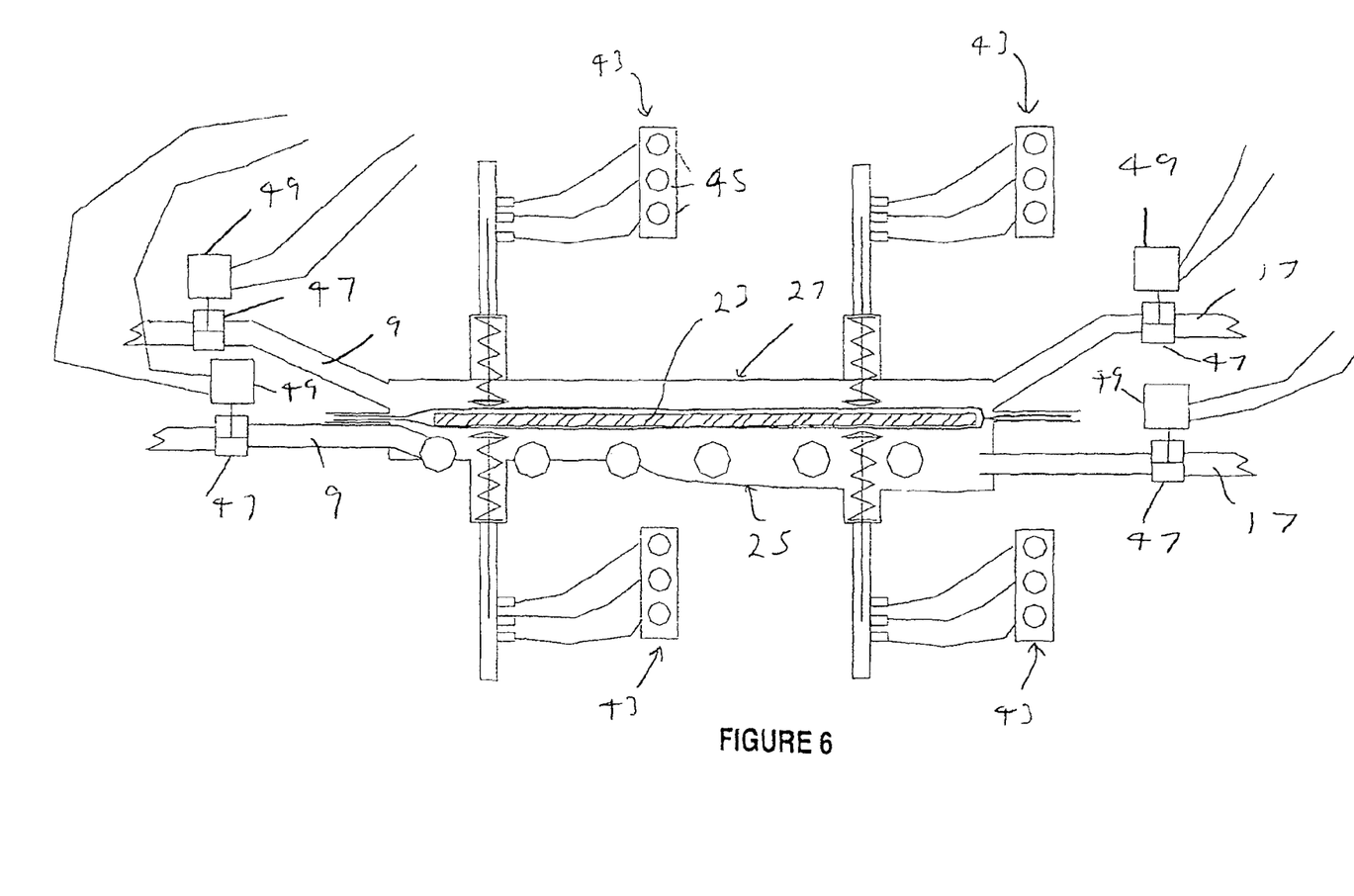
FIGS. 6 and 7 are side cross-sectional views of the composite component production system shown in FIGS. 4 and 5 and further showing a mold position control arrangement.
Figure 7:
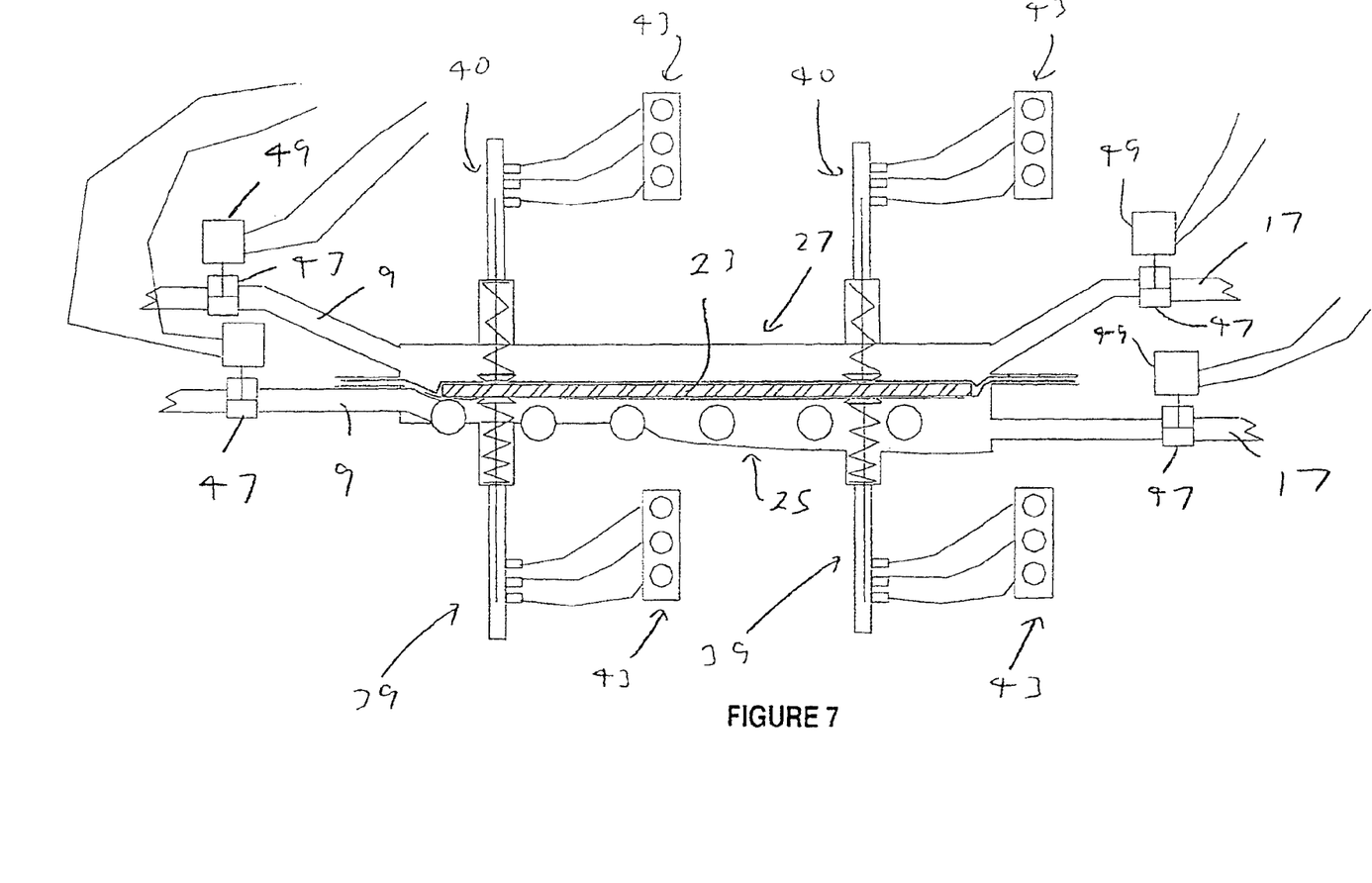

FIGS. 6 and 7 are similar to FIGS. 4 and 5 in that these figures respectfully show the mold 23 positioned in the correct and incorrect positions. There is however also shown an arrangement for controlling the position of the mold 23 relative to the lower and upper pressure chambers 25, 27. This arrangement includes a visual display 43 provided for each of the upper and lower measuring devices 40, 39. Each visual display 43 including a series of lights 45 that provide a visual indication of the position of the shaft 34, 33 within each measuring device 40, 39, and therefore the position of the mold 23. Three of these lights 45 are shown, with the middle light being of one color (for example green), while the upper and lower lights are another color (for example yellow). The mold will be in the correct position when only the middle light 45 is on. Valves 47 are respectively provided on the inlet lines 9 and the outlet lines 17 of both the lower and upper pressure chambers 25, 27. Each valve can be manually controlled by means of an electric activator 49 by an operator. This allows the fluid flow to each pressure chamber to be controlled to thereby allow the mold 23 to "float" to the correct position as the pressure differential between the chambers is varied.

Figure 8:
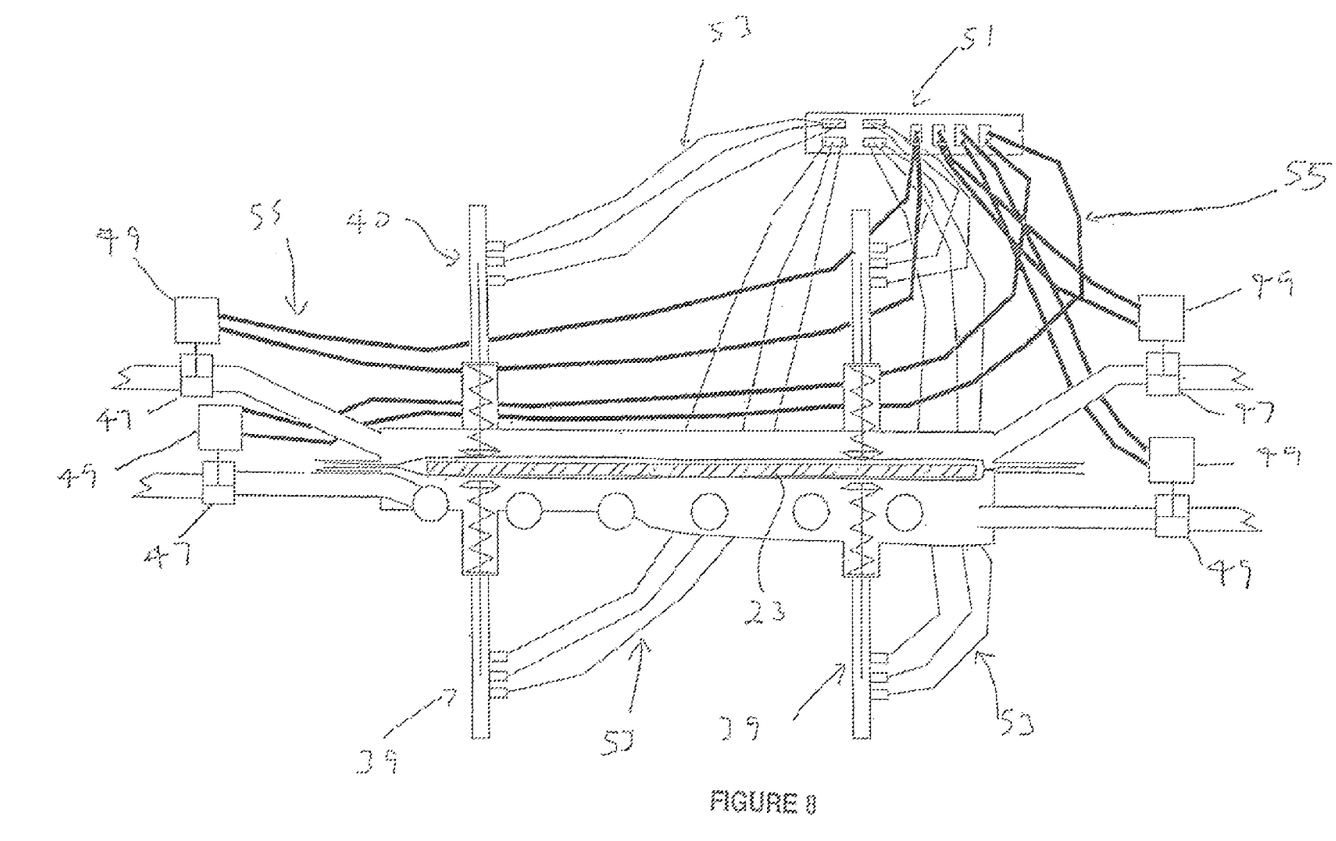
FIG. 8 is a side cross-sectional view of the composite component production system shown in FIGS. 4 and 5 and further showing another preferred embodiment of a mold position control arrangement.

FIG. 8 shows an alternative arrangement of a mold positioning control that uses a programmable logic controller (PLC) or personal computer (PC) as a controller 51 to provide a closed loop feedback system. Each measuring device 39, 40 is connected via input lines 53 to the controller 51 such that the controller 51 can receive a signal from each measuring device 39, 40 indicating the position of the mold 23. The controller 51 can provide control signals via output lines 55 to the electric actuators 49 for each valve 47. This system allows for accurate ongoing control of the position of the mold 23.

Modifications and variations as would be deemed obvious to the person skilled in the art are included within the ambit of the present invention as claimed in the appended claims

The invention claimed is:

1. A composite component production system including a pressure chamber comprising a first pressure chamber having a resiliently deformable chamber wall, a mold supportable on the chamber wall or forming part of said chamber wall a second pressure chamber located above the mold, the second pressure chamber having a second resiliently deformable chamber wall locatable over the mold, a support arrangement for resiliently supporting the mold at a predetermined height relative to a base of the first pressure chamber, a fluid supply system for supplying fluid at an elevated pressure to the first and second pressure chambers and a position measuring device for determining a height of the mold relative to the base of the pressure chamber, wherein the height of the mold is further controlled based on measurements obtained from said measuring device by varying the pressure of the fluid respectively supplied to the first and second pressure chambers to provide a pressure differential therebetween and to cause a subsequent movement of the mold from the higher pressure chamber into the lower pressure chamber.

2. A composite component production system according to claim 1, wherein the support arrangement includes at least one support member including a shaft with an abutment for engaging said chamber wall and/or mold, the shaft being resiliently supported by a resilient means.

3. A composite component production system according to claim 1, wherein the support arrangement includes at least one support member including a shaft with an abutment for engaging said chamber wall and/or mold, the shaft extending from and forming part of a hydraulic or pneumatic ram.

4. A composite component production system according to claim 3, wherein the support arrangement further includes a first measuring device for determining the relative displacement of the shaft to thereby ascertain the position of the mold above the base of the pressure chamber.

5. A composite component production system according to claim 1 further including at least one measuring arrangement located above the mold, the measuring arrangement including a shaft having an abutment for engaging the second chamber wall.

6. A composite component production system according to claim 5 further including resilient means for urging the abutment against the second chamber wall.

7. A composite component production system according to claim 5 further including a second measuring device for determining the relative displacement of the shaft to thereby ascertain the position of the mold above the base of the pressure chamber.

8. A composite component production system according to claim 4, wherein said first measuring device includes at least one magnetic or proximity measuring device, and the shaft is formed of non-magnetic material and includes a magnetic end portion, the magnetic measuring device determining the displacement of the magnetic end portion to thereby monitor a position of the shaft.

9. A composite component production system according to claim 4, the first measuring device, further including a visual display for providing an indication of the position of the mold.

10. A composite component production system according to claim 4, further including a controller for receiving signals from the measuring devices indicating the position of the mold and for providing an output to a fluid supply system for the at least one pressure chamber.

11. A composite component production system according to claim 1 and further including a fluid reticulation system locatable within an inner volume of the pressure chambers and including means for distributing fluid towards an inner surface of the chamber walls as a fluid enters the pressure chambers.

12. A composite component production system according to claim 11, including discharge means for directing a series of fluid jets towards the inner surface of the chamber wall.

13. A composite component production system according to claim 12, wherein the discharge means directs the fluid jets at an acute angle to the chamber wall inner surface immediately adjacent the fluid jets.

14. A composite component production system according to claim 12, including a plurality of parallel reticulation lines, each line having a plurality of discharge ports or nozzles extending along at least a substantial part of a length of each line.

15. A composite component production system according to claim 14, wherein the discharge means includes a rotating sprinkler head located on at least some of the discharge ports.

16. A composite component production system according to claim 6 further including a second measuring device for determining the relative displacement of the shaft to thereby ascertain the position of the mold above the base of the pressure chamber.

17. A composite component production system according to claim 7, wherein said first measuring device includes at least one magnetic or proximity measuring device, and the shaft is formed of non-magnetic material and includes a magnetic end portion, the magnetic measuring device determining the displacement of the magnetic end portion to thereby monitor a position of the shaft.

* * * * *